US012688132B2

(12) United States Patent
Ding et al.

(10) Patent No.: US 12,688,132 B2
(45) Date of Patent: Jul. 21, 2026

(54) METHOD AND APPARATUS FOR ACCESSING VEHICLE RESOURCE AND VEHICLE CONTROLLER

(71) Applicant: Yinwang Intelligent Technologies Co., Ltd., Shenzhen (CN)

(72) Inventors: Zhe Ding, Shenzhen (CN); Shuangcheng Li, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/645,945

(22) Filed: Apr. 25, 2024

(65) Prior Publication Data

US 2024/0273042 A1     Aug. 15, 2024

Related U.S. Application Data

(63) Continuation of application No. PCT/CN2021/125965, filed on Oct. 25, 2021.

(51) Int. Cl.
| | |
|---|---|
| *G06F 13/20* | (2006.01) |
| *G06F 13/40* | (2006.01) |
| *H04L 67/12* | (2022.01) |
| *H04L 67/565* | (2022.01) |

(52) U.S. Cl.
CPC .......... *G06F 13/20* (2013.01); *G06F 2213/40* (2013.01)

(58) Field of Classification Search
CPC ........................... B60W 60/0025; G07C 5/008
See application file for complete search history.

(56) References Cited

U.S. PATENT DOCUMENTS

| | | | | |
|---|---|---|---|---|
| 2010/0211582 A1* | 8/2010 | Kotski | .................. | G07C 5/008 |
| | | | | 709/206 |
| 2013/0304306 A1 | 11/2013 | Selkirk et al. | | |
| 2017/0259762 A1* | 9/2017 | Zoeller | .................. | B60R 25/24 |
| 2020/0073864 A1* | 3/2020 | Jo | ........................... | G06F 21/64 |
| 2020/0118364 A1* | 4/2020 | Hirase | .................. | G07C 5/008 |
| 2020/0324788 A1 | 10/2020 | Ando | | |
| 2020/0324789 A1* | 10/2020 | Ando | ............... | B60W 60/0025 |
| 2021/0152639 A1* | 5/2021 | Madden | .................. | H04L 67/55 |
| 2021/0216076 A1* | 7/2021 | Nayak | .................. | G06N 20/20 |
| 2022/0055604 A1* | 2/2022 | Cho | ........................ | B60L 50/16 |
| 2022/0263849 A1* | 8/2022 | Ujiie | .................... | G06F 21/577 |

FOREIGN PATENT DOCUMENTS

| | | |
|---|---|---|
| CN | 104412223 A | 3/2015 |
| CN | 111191422 A | 5/2020 |

* cited by examiner

*Primary Examiner* — Getente A Yimer
(74) *Attorney, Agent, or Firm* — Conley Rose, P.C.

(57) ABSTRACT

A method for accessing a vehicle resource includes a vehicle controller that receives first data of a vehicle sensor, where the first data is data in a physical format of the vehicle sensor. The vehicle controller converts the first data into second data, where the second data is data in an external message format. The vehicle controller sends the second data to the outside.

20 Claims, 11 Drawing Sheets

S310A

A vehicle controller receives first data of a vehicle sensor

S320A

The vehicle controller converts the first data into second data

S330A

The vehicle controller sends the second data to the outside

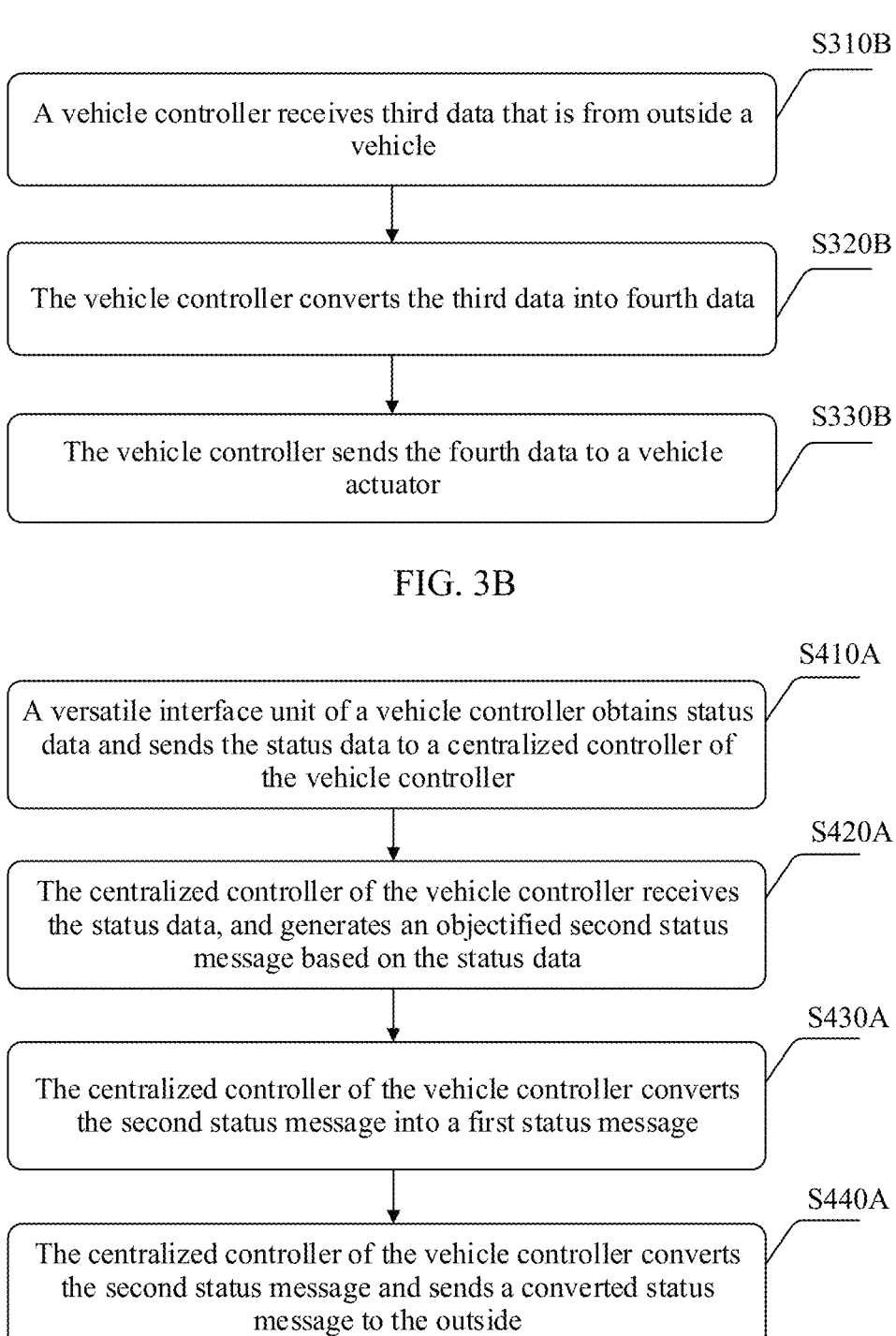

S310B

A vehicle controller receives third data that is from outside a vehicle

S320B

The vehicle controller converts the third data into fourth data

S330B

The vehicle controller sends the fourth data to a vehicle actuator

A versatile interface unit of a vehicle controller obtains status data and sends the status data to a centralized controller of the vehicle controller

S420A

The centralized controller of the vehicle controller receives the status data, and generates an objectified second status message based on the status data

S430A

The centralized controller of the vehicle controller converts the second status message into a first status message

S440A

The centralized controller of the vehicle controller converts the second status message and sends a converted status message to the outside

FIG. 4A

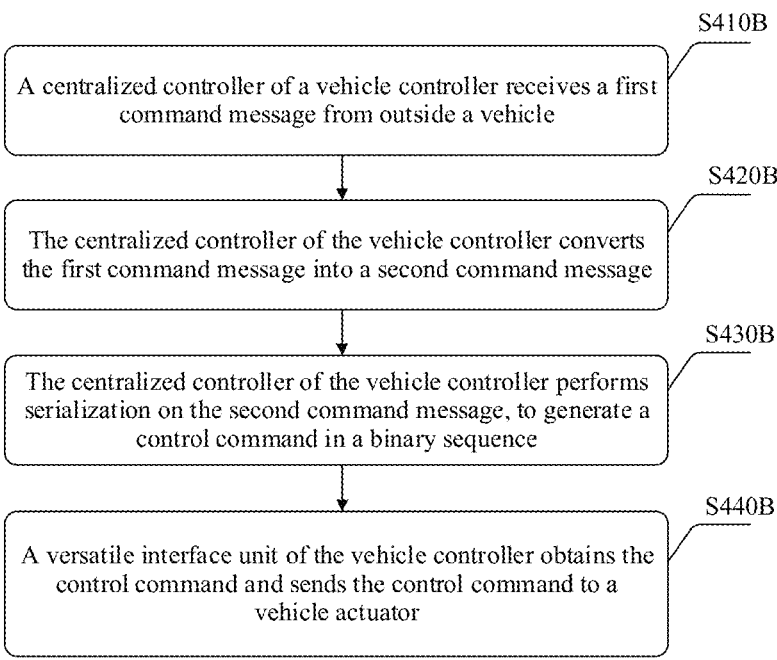

S410B

A centralized controller of a vehicle controller receives a first command message from outside a vehicle

S420B

The centralized controller of the vehicle controller converts the first command message into a second command message

S430B

The centralized controller of the vehicle controller performs serialization on the second command message, to generate a control command in a binary sequence

S440B

A versatile interface unit of the vehicle controller obtains the control command and sends the control command to a vehicle actuator

FIG. 4B

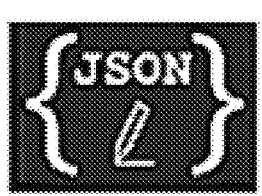

JSon structured
data in an HTTP
format

Structuration/
Objectification

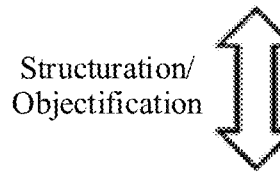

Objectified data
in an internal
message format

> DoIP (ISO13400) Protocol
> Header
  Version: DoIP ISO 13400-2:2012 (0x02)
  Inverse version: 0xfd
  Type: Diagnostic message ACK (0x8002)
  Length: 13
  Source Address: 0x0101
  Target Address: 0x0c00
  ACK code: ACK (0x00)
  Previous message: 3631000000000000

Serialization/
Deserialization

Binary sequence
data in a
physical format

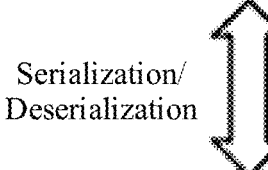

METHOD AND APPARATUS FOR ACCESSING VEHICLE RESOURCE AND VEHICLE CONTROLLER

CROSS-REFERENCE TO RELATED APPLICATIONS

This is a continuation of International Patent Application No. PCT/CN2021/125965 filed on Oct. 25, 2021, which is hereby incorporated by reference in its entirety.

TECHNICAL FIELD

This disclosure relates to the field of vehicle controller technologies, and in particular to a method and an apparatus for accessing a vehicle resource and a vehicle controller.

BACKGROUND

Vehicles are equipped with a plurality of advanced autonomous driving assistance functions. An autonomous driving level reaches L2 (or partial automation of vehicle driving) or a higher level. Evolution and transformation of vehicle technologies have never stopped. In transformation of intelligent interconnection, autonomous driving, shared mobility, and electric drive, the vehicle industry is continuously integrated with other industries (for example, an Internet technology (IT) industry), and a core technology of the vehicle industry will be greatly changed.

To cope with these changes, an electronic and electrical architecture of a vehicle shown in FIG. 1A changes from a distributed electronic control unit (ECU) to center centralized processing (for example, high performance computing (HPC)). A communication backbone network develops from a low-speed network such as a conventional controller area network (CAN) to a high-speed network such as automotive Ethernet (1000BASE-T1). In FIG. 1A, a solid line represents an automotive Ethernet connection, and a dashed line represents a bus connection.

After devices of a whole vehicle are equipped, it is difficult for engineers to access, outside a system, data resources provided by the devices of the vehicle to perform tests (such as calibration measurement). For example, a topological link of the automotive Ethernet is point-to-point communication, which is different from a conventional bus manner in that a switch chip needs to be added during cross-node data transmission. To access Ethernet data between an ECU 1 and the HPC, an original direct connection manner between the ECU 1 and the HPC needs to be disconnected, a connector required for a professional device shown in FIG. 1B is installed, and then a device is connected. Introduction of a professional test device and circuit reconstruction bring high hardware costs.

In another aspect, supporting software of the professional test device is required for deserialization and serialization of automotive Ethernet protocol data provided by the device. In addition, an installation platform for the supporting software is simple (for example, an operating system). The supporting software of the professional test device and a closed environment created by the simple installation platform bring additional software costs.

SUMMARY

In view of this, embodiments of this disclosure provide a method and an apparatus for accessing a vehicle resource, and a vehicle controller.

To achieve the foregoing objective, a first aspect of this disclosure provides a method for accessing a vehicle resource. The method includes a vehicle controller receives first data of a vehicle sensor, where the first data is data in a physical format of the vehicle sensor, the vehicle controller converts the first data into second data, where the second data is data in an external message format, and the vehicle controller sends the second data to the outside.

According to the foregoing, the first data in the physical format of the vehicle sensor is converted into the second data that is based on the open external message format, to send the second data to the outside, so that when the vehicle resource is accessed externally, there is no need to introduce an expensive professional test device and reconstruct an original harness. In addition, an existing disclosed IT technology ecosystem is used to access an automotive resource simply.

In a possible implementation of the first aspect, a process in which the vehicle controller converts the first data into the second data includes converting the first data into fifth data, where the fifth data is data in an internal message format, and converting the fifth data into the second data.

According to the foregoing, the first data in the physical format of the vehicle sensor is converted into the fifth data that is based on the internal message format, to facilitate internal use of the vehicle sensor.

In a possible implementation of the first aspect, the physical format includes a binary sequence format.

According to the foregoing, the first data is collected by using a binary sequence format that matches a physical layer of the vehicle sensor, so that the vehicle controller obtains a capability of an interface of the vehicle sensor.

In a possible implementation of the first aspect, the external message format includes a Hypertext Transfer Protocol (HTTP) format.

According to the foregoing, the HTTP format is used as the external message format, so that the outside can use an open IT ecosystem technology to access internal data of the vehicle controller.

To achieve the foregoing objective, a second aspect of this disclosure provides a method for accessing a vehicle resource. The method includes a vehicle controller receives third data that is from outside a vehicle, where the third data is data in an external message format, the vehicle controller converts the third data into fourth data, where the fourth data is data in a physical format of a vehicle actuator, and the vehicle controller sends the fourth data to the vehicle actuator.

According to the foregoing, the third data based on the open external message format is obtained from the outside, and is converted into the fourth data that is based on the physical format of the vehicle actuator, to control the vehicle actuator, so that when a control vehicle is debugged or calibrated externally, there is no need to introduce an expensive professional test device and reconstruct an original harness. In addition, an existing disclosed IT technology ecosystem is used to perform debugging and calibration simply.

In a possible implementation of the second aspect, a process in which the vehicle controller converts the third data into the fourth data includes converting the third data into sixth data, where the sixth data is data in an internal message format, and converting the sixth data into the fourth data.

According to the foregoing, the third data in the external message format is converted into the sixth data that is based on the internal message format, to facilitate internal use of the vehicle sensor.

In a possible implementation of the second aspect, the physical format includes a binary sequence format.

According to the foregoing, the fourth data is sent by using a binary sequence format that matches a physical layer of the vehicle actuator, so that the vehicle controller obtains a capability of an interface of the vehicle actuator.

In a possible implementation of the second aspect, the external message format includes an HTTP format.

According to the foregoing, the HTTP is used as the external message format, so that the vehicle controller can use an open IT ecosystem technology to receive external control.

To achieve the foregoing objective, a third aspect of this disclosure provides an apparatus for accessing a vehicle resource. The apparatus includes an interface module and a gateway module. The interface module is configured to enable a vehicle controller to receive first data of a vehicle sensor, and the first data is data in a physical format of the vehicle sensor. The gateway module is configured to enable the vehicle controller to convert the first data into second data, and the second data is data in an external message format. The gateway module is further configured to enable the vehicle controller to send the second data to the outside.

According to the foregoing, the first data in the physical format of the vehicle sensor is converted into the second data that is based on the open external message format, to send the second data to the outside, so that when the vehicle resource is accessed externally, there is no need to introduce an expensive professional test device and reconstruct an original harness. In addition, an existing disclosed IT technology ecosystem is used to access an automotive resource simply.

In a possible implementation of the third aspect, the gateway module includes a south gateway module and a north gateway module. The south gateway module is configured to convert the first data into fifth data, and the fifth data is data in an internal message format. The north gateway module is configured to convert the fifth data into the second data.

According to the foregoing, the first data in the physical format of the vehicle sensor is converted into the fifth data that is based on the internal message format, to facilitate internal use of the vehicle sensor.

In a possible implementation of the third aspect, the physical format includes a binary sequence format.

According to the foregoing, the first data is collected by using a binary sequence format that matches a physical layer of the vehicle sensor, so that the vehicle controller obtains a capability of an interface of the vehicle sensor.

In a possible implementation of the third aspect, the external message format includes an HTTP format.

According to the foregoing, the HTTP format is used as the external message format, so that the outside can use an open IT ecosystem technology to access internal data of the vehicle controller.

To achieve the foregoing objective, a fourth aspect of this disclosure provides an apparatus for accessing a vehicle resource. The apparatus includes an interface module and a gateway module. The gateway module is configured to enable a vehicle controller to receive third data that is from outside a vehicle, and the third data is data in an external message format. The gateway module is further configured to enable the vehicle controller to convert the third data into fourth data, and the fourth data is data in a physical format of a vehicle actuator. The interface module is configured to enable the vehicle controller to send the fourth data to the vehicle actuator.

According to the foregoing, the third data based on the open external message format is obtained from the outside, and is converted into the fourth data that is based on the physical format of the vehicle actuator, to control the vehicle actuator, so that when a control vehicle is debugged or calibrated externally, there is no need to introduce an expensive professional test device and reconstruct an original harness. In addition, an existing disclosed IT technology ecosystem is used to perform debugging and calibration simply.

In a possible implementation of the fourth aspect, the gateway module includes a south gateway module and a north gateway module. The north gateway module is configured to convert the third data into sixth data, and the sixth data is data in an internal message format. The south gateway module is configured to convert the sixth data into fourth data.

According to the foregoing, the third data in the external message format is converted into the sixth data that is based on the internal message format, to facilitate internal use of the vehicle sensor.

In a possible implementation of the fourth aspect, the physical format includes a binary sequence format.

According to the foregoing, the fourth data is sent by using a binary sequence format that matches a physical layer of the vehicle actuator, so that the vehicle controller obtains a capability of an interface of the vehicle actuator.

In a possible implementation of the fourth aspect, the external message format includes an HTTP format.

According to the foregoing, the HTTP is used as the external message format, so that the vehicle controller can use an open IT ecosystem technology to receive external control.

To achieve the foregoing objective, a fifth aspect of this disclosure provides a vehicle controller. The vehicle controller includes the apparatus according to any possible implementation of the third aspect, the apparatus according to any possible implementation of the fourth aspect, a versatile interface unit, and a centralized controller, where the interface module is deployed in the versatile interface unit, and the gateway module is deployed in the centralized controller.

To achieve the foregoing objective, a sixth aspect of this disclosure provides a computing device. The computing device includes at least one processor and at least one memory, where the memory stores program instructions, and when the program instructions are executed by the at least one processor, the at least one processor is enabled to perform the method according to any possible implementation of the first aspect or the method according to any possible implementation of the second aspect.

To achieve the foregoing objective, a seventh aspect of this disclosure provides a computer-readable storage medium. The computer-readable storage medium stores program instructions, and when the program instructions are executed by a computer, the computer is enabled to perform the method according to any possible implementation of the first aspect or the method according to any possible implementation of the second aspect.

To achieve the foregoing objective, an eighth aspect of this disclosure provides a computer program product. The computer program product includes program instructions, and when the program instructions are executed by a computer, the computer is enabled to perform the method according to any possible implementation of the first aspect or the method according to any possible implementation of the second aspect.

In conclusion, in embodiments of this disclosure, when the vehicle resource is accessed, there is no need to introduce an expensive professional test device and reconstruct an original harness. In addition, an existing disclosed IT technology ecosystem is used to access an automotive resource simply.

These aspects and another aspect of this disclosure will be clearer and easier to understand in descriptions of the following (a plurality of) embodiments.

BRIEF DESCRIPTION OF DRAWINGS

The following further describes features of this disclosure and a relationship between the features with reference to the accompanying drawings. The accompanying drawings are all examples, and some features are not shown in actual proportions. In addition, in some accompanying drawings, common features that are not mandatory for this disclosure in the field of this disclosure may be omitted. Alternatively, additional features that are not mandatory for this disclosure are shown. A combination of the features shown in the accompanying drawings is not intended to limit this disclosure. In addition, in this specification, same reference numerals represent same content. The specific accompanying drawings are described as follows.

FIG. 3B is a schematic flowchart of a second method embodiment for accessing a vehicle resource according to this disclosure;

FIG. 4A is a schematic flowchart of a third method embodiment for accessing a vehicle resource according to this disclosure;

FIG. 4B is a schematic flowchart of a fourth method embodiment for accessing a vehicle resource according to this disclosure;

FIG. 4D is a schematic diagram of a data conversion process of the third method embodiment and the fourth method embodiment according to this disclosure;

DESCRIPTION OF EMBODIMENTS

Figures 1A, 1B:
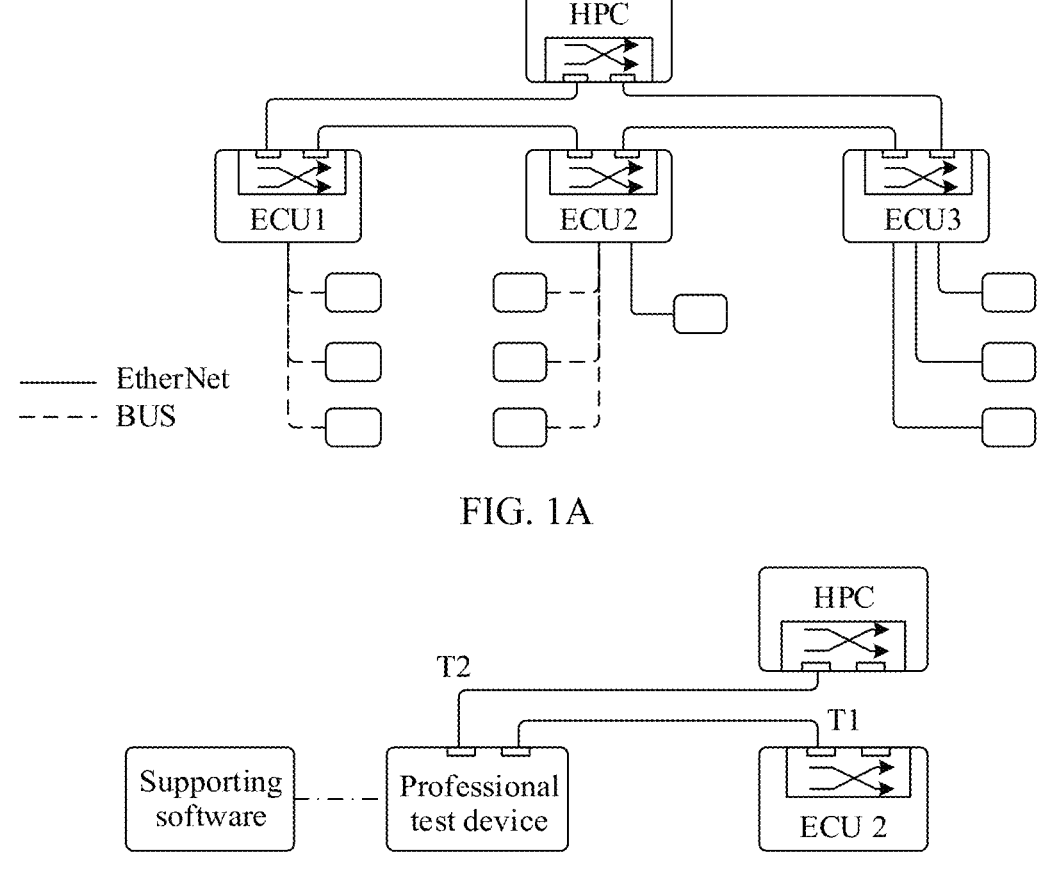
FIG. 1A is a schematic diagram of an electronic and electrical architecture of a vehicle.
FIG. 1B is a schematic diagram of a structure of accessing a vehicle resource by using a professional device.

The following further describes the technical solutions provided in this disclosure with reference to the accompanying drawings and embodiments. It should be understood that system architectures and service scenarios in embodiments of this disclosure are mainly intended to describe possible implementations of the technical solutions of this disclosure, and should not be construed as a unique limitation on the technical solutions of this disclosure. A person of ordinary skill in the art may learn that, with evolution of a system structure and emergence of a new service scenario, the technical solutions provided in this disclosure are also applicable to a similar technical problem.

It should be understood that the solution for exchanging data between a vehicle controller and the outside provided in embodiments of this disclosure includes an apparatus and a method for exchanging data between a vehicle controller and the outside, a computing device, a computer-readable storage medium, and a computer program product. Due to same or similar principles of solving problems by these technical solutions, in the following descriptions of specific embodiments, some repeated parts may not be described herein, but it should be considered that the specific embodiments are mutually referenced and may be combined with each other.

Before the specific implementations of this disclosure are further described in detail, technical terms in embodiments of this disclosure are described. Unless otherwise defined, all technical and scientific terms used in this specification have same meanings as those usually understood by a person skilled in the art of this disclosure. In case of any inconsistency, the meaning described in this specification or the meaning obtained according to the content recorded in this specification shall be used. In addition, the terms used in this specification are merely for the purpose of describing embodiments of this disclosure, but are not intended to limit this disclosure.

To accurately describe technical content in this disclosure and accurately understand this disclosure, the following explanations, descriptions, or definitions are first provided for terms used in this specification before specific implementations are described.

Vehicle controller is a controller configured to complete control functions of a whole vehicle or a plurality of functional domains. For example, the functional domains may include fields such as an intelligent cockpit, a vehicle body, and autonomous driving, or include sub-functional domains including the foregoing functional domains.

Versatile interface unit (VIU) is configured to implement device connections of a vehicle sensor and a vehicle actuator in one functional domain.

Centralized controller (XDC) is configured to implement control functions in one or more functional domains of a vehicle.

HTTP is a network transfer protocol widely applied on the Internet, is a transmission protocol used to transmit hypertext from a World Wide Web (WWW) server to a local browser, and transmits data based on a Transmission Control Protocol (TCP)/Internet Protocol (IP) communication protocol.

JAVASCRIPT (JS) object notation (JSON) is a lightweight data exchange format. Data is stored and represented in a text format that is completely independent of programming languages. A simple and clear hierarchical structure makes the text format an ideal data exchange language, which is easy to read and write, is easy to be parsed and generated by a machine, and effectively improves network transmission efficiency.

Objectification is to encapsulate a target status and an operation performed on the target status together. In embodiments of this disclosure, objectification is performed on a vehicle sensor and a vehicle actuator in a service-oriented manner.

Figures 1C, 2A:
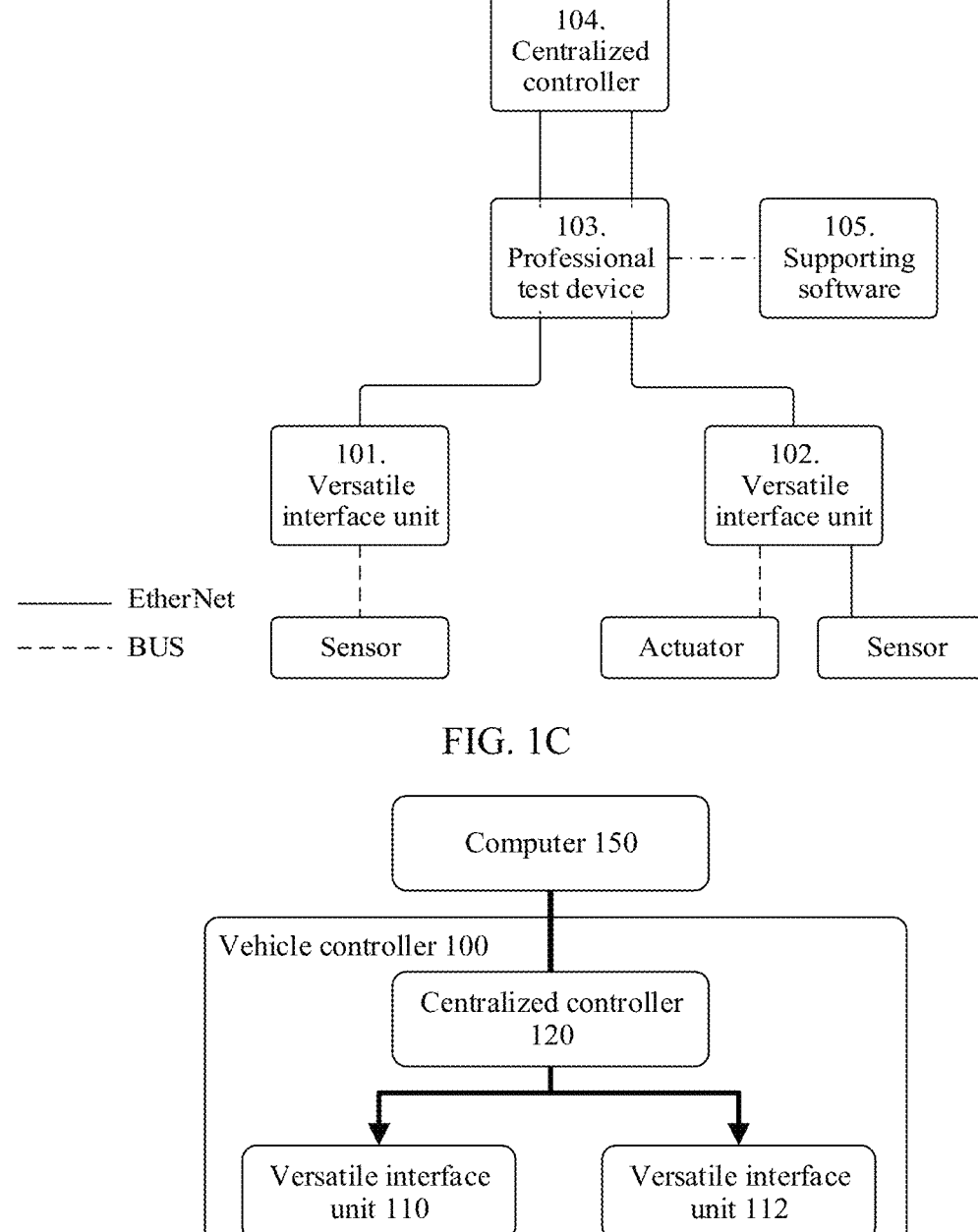
FIG. 1C is a schematic diagram of a structure of accessing a vehicle resource through Ethernet by using a professional device.
FIG. 2A is a schematic diagram of a structure of an application scenario according to an embodiment of this disclosure.

FIG. 1C shows a calibration measurement solution based on an Ethernet backbone network. The solution includes a versatile interface unit 101 and a versatile interface unit 102. The versatile interface unit 101 and the versatile interface unit 102 are responsible for device connections of a vehicle sensor and a vehicle actuator in a functional domain. The solution further shows a centralized controller 104, a professional test device 103, and supporting software 105 corresponding to the professional test device 103.

Original topology is that the versatile interface unit 101 and the versatile interface unit 102 are directly connected to the centralized controller 104, to provide an automotive Ethernet protocol data service. When data of the versatile interface unit is to be calibrated and measured, the professional test device 103 and the supporting software 105 corresponding to the professional test device 103 are first introduced. Then, original harnesses that are of the versatile interface unit 101 and the versatile interface unit 102 and that are directly connected to the centralized controller 104 are reconstructed. The original harnesses are disconnected, a connector required for the professional test device is installed on the harnesses, and then the harnesses are connected to a device. Then, the professional test device 103 performs bypass measurement or calibration on the data.

In a whole process, an engineer configures a physical link for the professional test device 103 by using the professional supporting software 105. The physical link is successfully connected to perform data calibration and measurement. Serialization and deserialization for the automotive Ethernet protocol data are also implemented by using the professional test device.

In the calibration and measurement solution, a hardware device cost is high, and an expensive professional test device is introduced. In addition, the original harnesses are reconstructed. In another aspect, a software interface is not open. The serialization and deserialization are performed on calibration status data by using professional supporting software, and an existing IT technology ecosystem cannot be used to access an automotive resource simply.

Figures 2B, 3A:
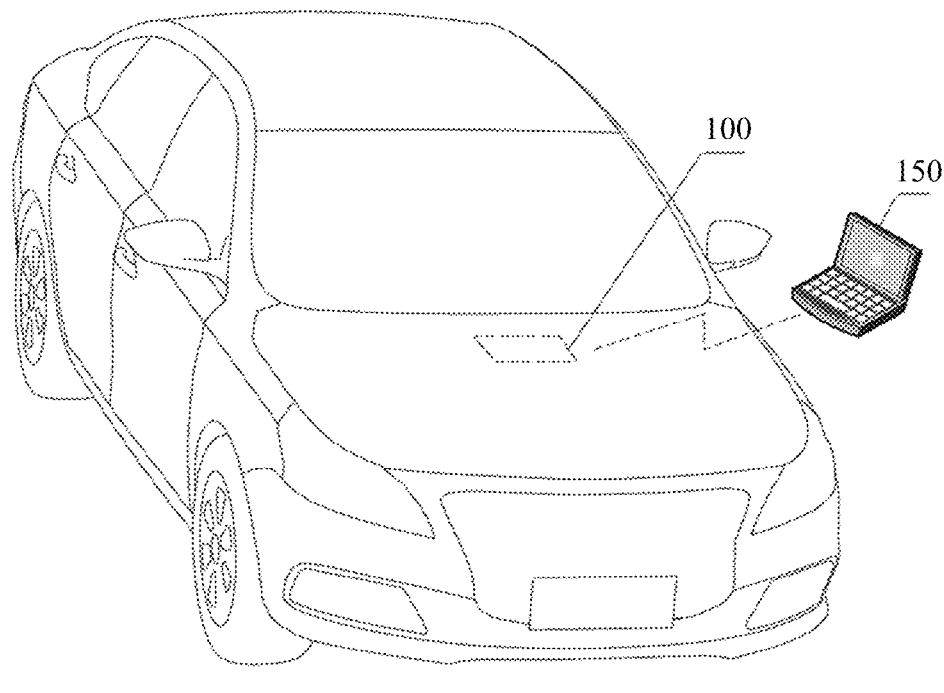
FIG. 2B is a schematic diagram of an application scenario according to an embodiment of this disclosure.
FIG. 3A is a schematic flowchart of a first method embodiment for accessing a vehicle resource according to this disclosure.

With reference to FIG. 2A and FIG. 2B, the following briefly describes a scenario in which a solution for accessing a vehicle resource provided in an embodiment of this disclosure is applied to a vehicle.

In this disclosure scenario, as shown in FIG. 2A, the vehicle includes a vehicle controller 100, a sensor 130, a sensor 132, and an actuator 140. The vehicle controller 100 may be a whole vehicle controller or a controller in a functional domain, for example, an intelligent cockpit controller. The vehicle controller 100 includes a versatile interface unit 110, a versatile interface unit 112, and a centralized controller 120. The versatile interface unit 110 and the versatile interface unit 112 are responsible for device connections of the sensor 130, the sensor 132, and the actuator 140 in the functional domain. For example, FIG. 2A shows two versatile interface units, and may actually include a plurality of versatile interface units, and each versatile interface unit may be an ECU. The centralized controller 120 implements a control function of a whole vehicle, control functions in one or more fields, or a control function in a specific functional domain. The centralized controller 120 may be an HPC, a multi-domain controller (MDC), or an ECU. The sensor 130 and the sensor 132 are configured to collect data. For example, FIG. 2A shows two vehicle sensors, and may actually include a plurality of vehicle sensors that are separately connected to the versatile interface units. The vehicle sensor may include a vehicle speed sensor, a roll angle sensor, a distance sensor, a temperature sensor, a brightness sensor, a humidity sensor, a power sensor, or the like. The actuator 140 is configured to execute a control command of the centralized controller 120. For example, FIG. 2A shows one vehicle actuator, and may actually include a plurality of vehicle actuators that are separately connected to the versatile interface units. The vehicle actuator includes a motor, a clutch, a solenoid valve, a switch, an anti-lock braking system (ABS) brake caliper, or the like.

In this disclosure scenario, as shown in FIG. 2A and FIG. 2B, an external computer 150 communicates with the vehicle controller 100, and is configured to obtain, by using the centralized controller 120 of the vehicle controller 100, data collected by the vehicle sensor, and to issue a control command to the vehicle actuator by using the centralized controller 120. In some embodiments, the external computer may communicate with the vehicle controller 100 in a wired or wireless manner. The external computer may also be replaced with a device such as a tablet computer (or IPAD) or a smartphone.

The following describes embodiments of this disclosure based on the accompanying drawings.

First, a first method embodiment and a second method embodiment for accessing a vehicle resource provided in this disclosure are described. Methods in the first embodiment and the second embodiment may be run in the vehicle controller 100 shown in FIG. 2A. In the first method embodiment and the second method embodiment, a vehicle controller accesses a vehicle sensor or controls a vehicle actuator based on data in a physical format, and interacts with a device outside a vehicle based on data in an open external message format. Therefore, when the device outside the vehicle accesses a vehicle resource, a new device may not be added, and an existing vehicle controller may not be reconstructed.

FIG. 3A shows a procedure of a first method embodiment for accessing a vehicle resource. In this embodiment, a vehicle controller 100 obtains, from a vehicle sensor, first data that is based on a physical format of the vehicle sensor, and converts the first data into data that is based on an open external message format, to send converted data to the outside. The following describes this embodiment in detail with reference to FIG. 3A. This embodiment includes step S310A to step S330A.

S310A: The vehicle controller 100 receives the first data of the vehicle sensor. The first data is the data in the physical format of the vehicle sensor.

In this embodiment, the data in the physical format includes binary sequence data. In some other embodiments, the data in the physical format includes hexadecimal or octal sequence data.

In some embodiments, the vehicle controller 100 receives the first data of the vehicle sensor by using a versatile interface unit. In this embodiment, the versatile interface unit may be implemented by an ECU included in the vehicle controller 100.

In some embodiments, the interface unit of the vehicle controller 100 communicates with the vehicle sensor by using a universal bus protocol, to obtain the first data of the vehicle sensor. In some embodiments, the universal bus protocol may include a CAN bus protocol, a high-speed CAN bus protocol, a FlexRay protocol, a Time Triggered Protocol (TTP), a Vehicle Area Network (VAN) protocol, a Local Interconnect Network (LIN) bus protocol, or the like.

In some embodiments, the vehicle controller 100 transmits the first data from the versatile interface unit to a centralized controller 120 by using an internal communication protocol.

In some embodiments, the internal communication protocol may be an automotive Ethernet protocol, a VAN protocol, a LIN protocol, or the like.

S320A: The vehicle controller converts the first data into second data. The second data is data in an external message format.

In this embodiment, the data in the external message format includes data based on an HTTP format. An HTTP is a network transfer protocol widely applied to the Internet. Therefore, the data based on the HTTP format is more universal, which facilitates receiving and processing the data based on the HTTP format by various external devices. In some other embodiments, the data in the external message format may alternatively be data in a File Transfer Protocol (FTP) protocol format or the like.

In this embodiment, the second data is JSON-based structured data. The JSON-based structured data is easy to be read and written by people, is easy to be parsed and generated by a machine, and effectively improves network transmission efficiency. In some other embodiments, the structured data may alternatively be based on an Extensible Markup Language (XML), Protobuf (the Protobuf is a data exchange format), Flatbuffer (the Flatbuffer is a data exchange format), or the like.

In some embodiments, the first data and the second data are in a same service-oriented template structure.

In some embodiments, the vehicle controller 100 converts the first data into the second data by using the centralized controller 120. In some embodiments, the vehicle controller 100 may alternatively convert the data by using another controller, such as any ECU on the vehicle.

According to the foregoing, the vehicle controller sends the data that is based on the open external message format to the outside. Data of the vehicle sensor may be transmitted to an external apparatus without a dedicated third-party test device and reconstruction of an internal circuit of the vehicle controller.

In some embodiments, this step further includes converting the first data into fifth data, where the fifth data is data in an internal message format, and converting the fifth data into the second data.

In some embodiments, the first data and the fifth data are in a same service-oriented template structure.

According to the foregoing, the first data is converted into the fifth data in the internal message format, to facilitate internal use of the vehicle controller 100.

S330A: The vehicle controller sends the second data to the outside.

In some embodiments, the vehicle controller 100 sends the second data to the outside by using the centralized controller 120. In some embodiments, the vehicle controller 100 may send, in a wired transmission manner or a wireless transmission manner, the second data to an external apparatus by using the centralized controller 120. The external apparatus may be a general-purpose computer system, a tablet computer (or IPAD), a smartphone, or the like.

In some embodiments, the second data uses chunked transfer encoding, to facilitate multiplexing of a link of the second data.

FIG. 3B shows a procedure of a second method embodiment for accessing a vehicle resource. In this embodiment, a vehicle controller obtains third data that is based on an open external message format from the outside, and converts the third data into fourth data that is based on a physical format of a vehicle actuator, to control the vehicle actuator. The following describes this embodiment in detail with reference to FIG. 3B. This embodiment includes step S310B to step S330B.

S310B: The vehicle controller 100 receives the third data that is from outside a vehicle.

The third data is data in the open external message format.

In some embodiments, the data in the external message format includes data based on an HTTP format, may be data based on an FTP protocol format, or the like. For details, refer to related descriptions of the external message format in step S320A.

In some embodiments, the third data is JSON-based structured data or data based on an XML, Protobuf, Flatbuffer, or the like. For details, refer to related descriptions of the structured data in step S320A.

In some embodiments, the vehicle controller 100 receives the third data that is from an external apparatus outside the vehicle by using a centralized controller 120. The vehicle controller 100 may receive the third data in a wired transmission manner or a wireless transmission manner.

S320B: The vehicle controller 100 converts the third data into the fourth data. The fourth data is data in the physical format of the vehicle actuator.

In some embodiments, the data in the physical format includes binary sequence data or may be hexadecimal or octal sequence data, or the like, and a format of the fourth data may be subject to a physical format supported by an actuator.

In some embodiments, the third data and the fourth data are in a same service-oriented template structure.

In some embodiments, the vehicle controller 100 converts the third data into the fourth data by using the centralized controller 120. In some embodiments, the vehicle controller 100 may alternatively convert the data by using another controller, such as any ECU on the vehicle.

According to the foregoing, the vehicle controller receives the external data that is based on the open external message format, and converts the data into the data in the physical format of the vehicle actuator. Data sent by the external general-purpose computer system can be received without a need for a dedicated third-party test device and a need to reconstruct an internal circuit of the vehicle controller.

In some embodiments, this step further includes converting the third data into sixth data, where the sixth data is data in an internal message format, and converting the sixth data into the fourth data.

In some embodiments, the sixth data and the fourth data are in a same service-oriented template structure.

According to the foregoing, the third data is converted into the sixth data in the internal message format, to facilitate internal use in the vehicle controller 100.

S330B: The vehicle controller sends the fourth data to the actuator 140.

In some embodiments, the vehicle controller 100 sends the fourth data from the centralized controller 120 to a versatile interface unit by using an internal communication protocol. In some embodiments, the internal communication protocol may be an automotive Ethernet protocol, a VAN protocol, a LIN protocol, or the like.

In some embodiments, the vehicle controller 100 sends the fourth data to the actuator 140 by using the versatile interface unit. In this embodiment, the versatile interface unit may be implemented by an ECU included in the vehicle controller 100.

In some embodiments, the interface unit of the vehicle controller 100 communicates with the actuator by using a universal bus protocol, to send the fourth data to the actuator. In some embodiments, the universal bus protocol may include a CAN bus protocol, a high-speed CAN bus protocol, a FlexRay protocol, a TTP, a VAN protocol, a LIN bus protocol, or the like.

In some embodiments, the procedure of the first method embodiment for accessing the vehicle resource and the procedure of the second method embodiment for accessing the vehicle resource are separately executed in a single manner, to collect data of the vehicle sensor or control the vehicle actuator.

In some embodiments, the procedure of the first method embodiment for accessing the vehicle resource is first performed, and then the procedure of the second method embodiment for accessing the vehicle resource is performed, for example, in a data calibration process.

In some embodiments, the procedure of the first method embodiment for accessing the vehicle resource and the procedure of the second method embodiment for accessing the vehicle resource are performed repeatedly and alternately, for example, in a troubleshooting process or a debugging process.

In conclusion, in the foregoing method embodiments for accessing the vehicle resource, the first data based on the physical format of the vehicle sensor is collected from the vehicle sensor, and is converted into the data that is based on the open external message format to be sent to the outside. The third data based on the open external message format is obtained from the outside, and is converted into the fourth data that is based on the physical format of the vehicle actuator to control the vehicle actuator. In the foregoing method embodiments for accessing the vehicle resource, there is no need to introduce an expensive professional test device, and to reconstruct an original harness. In addition, an existing disclosed IT technology ecosystem is used to access an automotive resource simply.

Embodiments of this disclosure further provide a third method embodiment and a fourth method embodiment for accessing a vehicle resource. The following describes the third method embodiment and the fourth method embodiment with reference to the accompanying drawings.

The third method embodiment and the fourth method embodiment are executed by the vehicle controller 100 shown in FIG. 2A. The vehicle controller 100 accesses a vehicle sensor or controls a vehicle actuator based on data in a physical format of a binary sequence, and externally interacts with the outside based on data in an open HTTP format, so that when a vehicle resource is accessed, a new device is not added and a harness of an existing vehicle controller is not reconstructed, and an existing IT ecosystem technology is used to interconnect with a system outside a vehicle.

FIG. 4A shows a procedure of the third method embodiment. In the procedure of the third embodiment, a versatile interface unit collects first data (for ease of description, referred to as status data subsequently in this embodiment) in a physical format of a vehicle sensor from the vehicle sensor to send the status data to a centralized controller 120. The centralized controller 120 first generates fifth data in an internal message format (for ease of description, referred to as a second status message subsequently in this embodiment) based on the status data, and then generates second data in an HTTP format (for ease of description, referred to as a first status message subsequently in this embodiment) based on the second status message, to send the first status message to an external computer 150. Step S410A to step S440A are included.

FIG. 4B shows a procedure of the fourth method embodiment. In the procedure of the fourth embodiment, a centralized controller 120 receives third data in an open HTTP format (for ease of description, referred to as a first command message subsequently in this embodiment) from an external computer. The centralized controller 120 generates sixth data (for ease of description, referred to as a second command message subsequently in this embodiment) based on the first command message, then generates fourth data that is based on a physical format of an actuator (for ease of description, referred to as a control command subsequently in this embodiment) based on the second command message, and sends the control command to a versatile interface unit. The versatile interface unit sends the received control command to the vehicle actuator to control a vehicle. Step S410B to step S440B are included.

Refer to FIG. 4A. The following describes in detail specific steps included in the third method embodiment.

S410A: The versatile interface unit of a vehicle controller 100 obtains the status data, and sends the status data to the centralized controller 120 of the vehicle controller 100.

The status data is binary sequence data that is in a physical format of a related status and that is collected by the vehicle sensor.

The vehicle controller 100 collects data from the vehicle sensor by using a service-oriented architecture (SOA) application programming interface (API), generates content of the status data based on a service-oriented template, and adds a related service type identifier and a related data type identifier to generate the status data, where the data type identifier of the status data is a data identifier.

The status data is transmitted by using an internal communication protocol that is between the versatile interface unit and the centralized controller 120.

S420A: The centralized controller 120 of the vehicle controller 100 receives the status data, and generates an objectified second status message based on the status data.

The second status message is objectified data in the internal message format, to facilitate use of a subscribed application (APP) in the centralized controller 120.

A template structure of content of the second status message is the same as a template structure of content of the status data, and is a service-oriented template structure.

S430A: The centralized controller 120 of the vehicle controller 100 converts the second status message into the first status message.

The first status message is JSON structured data based on an HTTP format, and is in a representational state transfer (REST) style, to facilitate the external computer 150 using the first status message by using an open IT technology ecosystem.

A template structure of content of the first status message is the same as a template structure of content of the status data.

S440A: The centralized controller 120 of the vehicle controller 100 converts the second status message to the first status message and send it to the outside.

When the first status message is periodic data, the first status message uses chunked transfer encoding, to facilitate multiplexing of a link of the first status message.

Refer to FIG. 4B. The following describes in detail specific steps included in the fourth method embodiment.

S410B: The centralized controller 120 of the vehicle controller 100 receives the first command message from outside a vehicle.

The first command message is JSON structured data based on an HTTP format, to facilitate receiving a command that passes through the external computer 150 by using an open IT ecosystem technology.

S420B: The centralized controller 120 of the vehicle controller 100 converts the first command message into the second command message.

The second command message is objectified structured data in the internal message format, to facilitate internal use of the centralized controller 120.

A template structure of content of the second command message is the same as a template structure of content of the first command message, and is a service-oriented template structure.

S430B: The centralized controller 120 of the vehicle controller 100 performs serialization on the second command message, to generate a control command in a binary sequence. A format of the control command is the physical format of the vehicle actuator.

The template structure of content of the second command message is the same as a template structure of content of the control command.

S440B: The versatile interface unit of the vehicle controller 100 obtains the control command, and sends the control command to the vehicle actuator.

The status data is transmitted by using an internal communication protocol that is between the versatile interface unit and the centralized controller 120.

The versatile interface unit sends the command to the vehicle actuator by using the SOA API.

The following describes an example of the data in the third method embodiment and the fourth method embodiment with reference to the accompanying drawings.

Figure 4C:
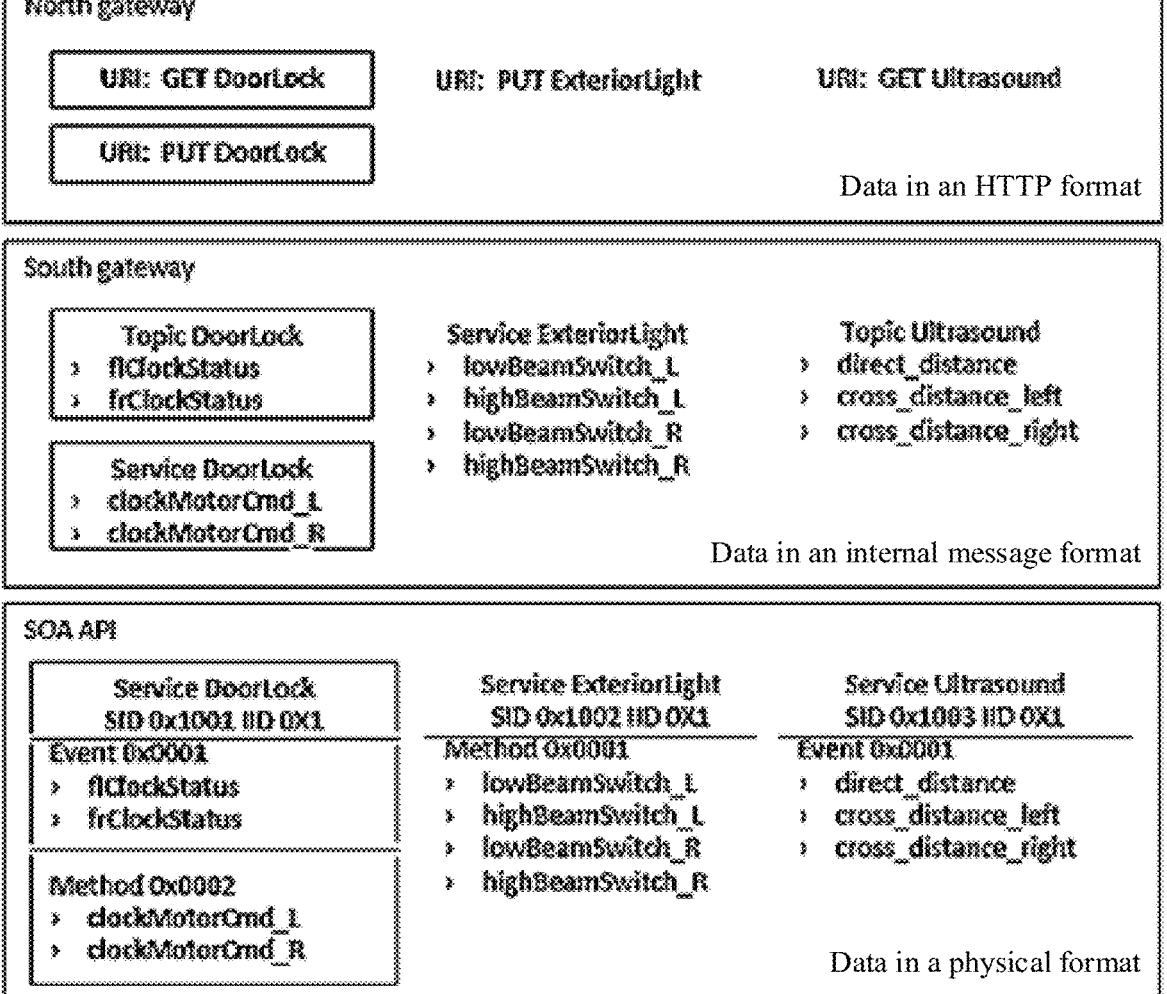
FIG. 4C is a schematic diagram of data of the third method embodiment and the fourth method embodiment according to this disclosure.

For example, FIG. 4C shows data of three service types which respectively are: status data and control data that are in a physical format, a second status message and a second command message that are in an internal message format, and a first status message and a first command message that are in an HTTP format from bottom to top.

First, data on the left side of FIG. 4C is described, and a service type of the data is a doorlock service (Service DoorLock). Data in a lower square frame of the figure is data in the physical format, a service type identifier is SID 0x1001, and the data includes status data of a vehicle door status and a control command of a vehicle door. A data type identifier of the status data is Event 0x0001, where Event represents the status data, and content of the status data includes a left door status (flClockStatus) and a right door status (frClockStatus). A data type identifier of the control command is Method 0x0002, where Method represents the control command, and content of the control command includes a left door control command (clockMotorCmd_L) and a right door control command (clockMotorCmd_R). Data in a middle square frame of the figure is data in the internal message format. Topic DoorLock is the second status message. Content of Topic DoorLock is the same as content of Event of Service DoorLock, and includes a left door status (flClockStatus) and a right door status (frClock-Status). Service DoorLock is the second command message. Content of Service DoorLock is the same as content of the control command, that is, content of Method of Service DoorLock, and includes a left door control command (clockMotorCmd_L) and a right door control command (clockMotorCmd_R). Data in an upper square frame of the figure is JSon structured data in the HTTP format. RI: GET DoorLock is obtaining the first status message of the vehicle door status. GET represents obtaining. Obtained content of DoorLock includes the left door status (flClockStatus) and the right door status (frClockStatus) in Topic DoorLock. URI: PUT DoorLock is sending the first command message of vehicle door control. PUT represents sending. Sent content of DoorLock includes the left door control command (clockMotorCmd_L) and the right door control command (clockMotorCmd_R) in Service DoorLock.

A middle text in FIG. 4C is a light service (Service ExteriorLight), and a service type identifier of the light service is SID 0x1002. A control command, a second command message, and a first command message that are of light are included from bottom to top. Content of the control command, the second command message, and the first command message are the same, and details are not described again. A right text in FIG. 4C is an ultrasound radar service (Service Ultrasound), and a service type identifier of the ultrasound radar service is SID 0x1003. Status data, a second status message, and a first status message that are of an ultrasound radar are included from bottom to top. Content of the status data, the second status message, and the first status message are the same, and details are not described again.

It should be noted that a text form displayed in FIG. 4C is for ease of description, and an actual form of the text form may be binary sequence data.

For example, FIG. 4D shows a data conversion relationship of the third method embodiment and the fourth method embodiment, and the data conversion relationship includes binary sequence status data in a physical format of a sensor is deserialized, then converted into an objectified second status message in an internal message format of a vehicle controller, and then converted into a JSON structured first status message in an HTTP format, and the JSON structured first status message in the HTTP format is converted into an objectified second command message in the internal message format, and then serialized into a binary sequence control command in the physical format.

In conclusion, in the third method embodiment and the fourth method embodiment, the status data in the physical format of the vehicle sensor is collected from the vehicle sensor, and converted into the second status message in the internal message format, and then the second status message is converted into the first status message in the open HTTP format, to send the first status message to the external computer 150. The first command message in the HTTP format is received from the external computer. The centralized controller 120 converts the first command message into the second command message in the internal message format based on the first command message, generates the control command in the physical format of the actuator based on the second command message, and sends the control command to the versatile interface unit to control the vehicle. In the third method embodiment and the fourth method embodiment, there is no need to introduce an expensive professional test device and reconstruct an original harness. In addition, an existing disclosed IT technology ecosystem is used to access an automotive resource simply. In addition, the second status message or/and the second command message that is/are in the internal message format and that are generated in the middle facilitates/facilitate internal use of the vehicle controller.

An embodiment of this disclosure provides a first apparatus embodiment for accessing a vehicle resource. The apparatus may be configured to perform the solutions in embodiments of the foregoing method for accessing a vehicle resource.

Figure 5:
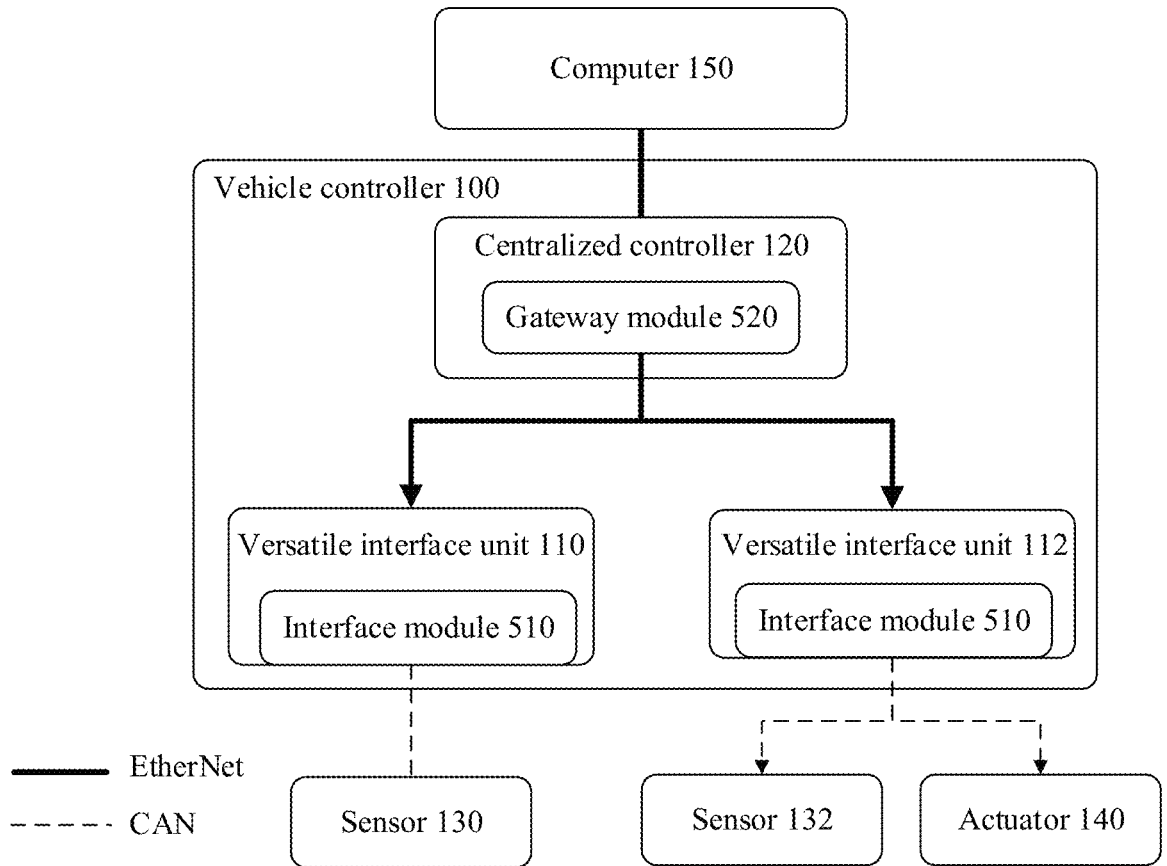
FIG. 5 is a schematic diagram of a structure of a first apparatus embodiment for accessing a vehicle resource according to this disclosure.

FIG. 5 shows a structure of the first apparatus embodiment, and the apparatus includes an interface module 510 and a gateway module 520.

The interface module 510 performs the foregoing step S310A and the optional embodiments of the step, and is configured to enable a vehicle controller 100 to receive first data of a vehicle sensor. The interface module 510 further performs the foregoing step S330B and the optional embodiments of the step, and is configured to enable the vehicle controller 100 to send fourth data.

The first data is data in a physical format of the vehicle sensor, and the fourth data is data in a physical format of a vehicle actuator.

In some embodiments, the data in the physical format includes binary sequence data.

In some embodiments, the interface module 510 is deployed on a versatile interface unit of the vehicle controller 100 shown in FIG. 2A.

The gateway module 520 performs the foregoing steps S320A and S330A and the optional embodiments of the two steps, and is configured to enable the vehicle controller 100 to convert the first data into second data and send the second data to the outside. The gateway module 520 further performs the foregoing step S310B and step S320B and the optional embodiments of the two steps, and is configured to enable the vehicle controller 100 to receive third data that is from outside a vehicle and convert the third data into fourth data.

The second data and the third data are data in an external message format.

In some embodiments, the data in the external message format includes data based on an HTTP format.

In some embodiments, the second data and the third data are JSON-based structured data.

In some embodiments, the first data and the second data are in a same service-oriented template.

In some embodiments, the third data and the fourth data are in a same service-oriented template.

In some embodiments, the gateway module 520 communicates with the interface module 510 by using an existing internal protocol of the vehicle controller 100.

In some embodiments, the gateway module 520 is deployed on a centralized controller 120 of the vehicle controller 100 shown in FIG. 2A.

In some embodiments, the gateway module 520 includes a south gateway module 521 and a north gateway module 522.

The south gateway module 521 is configured to enable the vehicle controller 100 to convert the first data into fifth data, and the north gateway module 522 is further configured to enable the vehicle controller 100 to convert the fifth data into the second data. The fifth data is data in an internal message format.

The north gateway module 522 is further configured to enable the vehicle controller 100 to convert the third data into sixth data, and the south gateway module 521 is further configured to enable the vehicle controller 100 to convert the sixth data into the fourth data. The sixth data is the data in the internal message format.

An embodiment of this disclosure further provides a vehicle controller, and the vehicle controller may be configured to perform the solutions in embodiments of the foregoing method for accessing a vehicle resource.

Figure 6A:
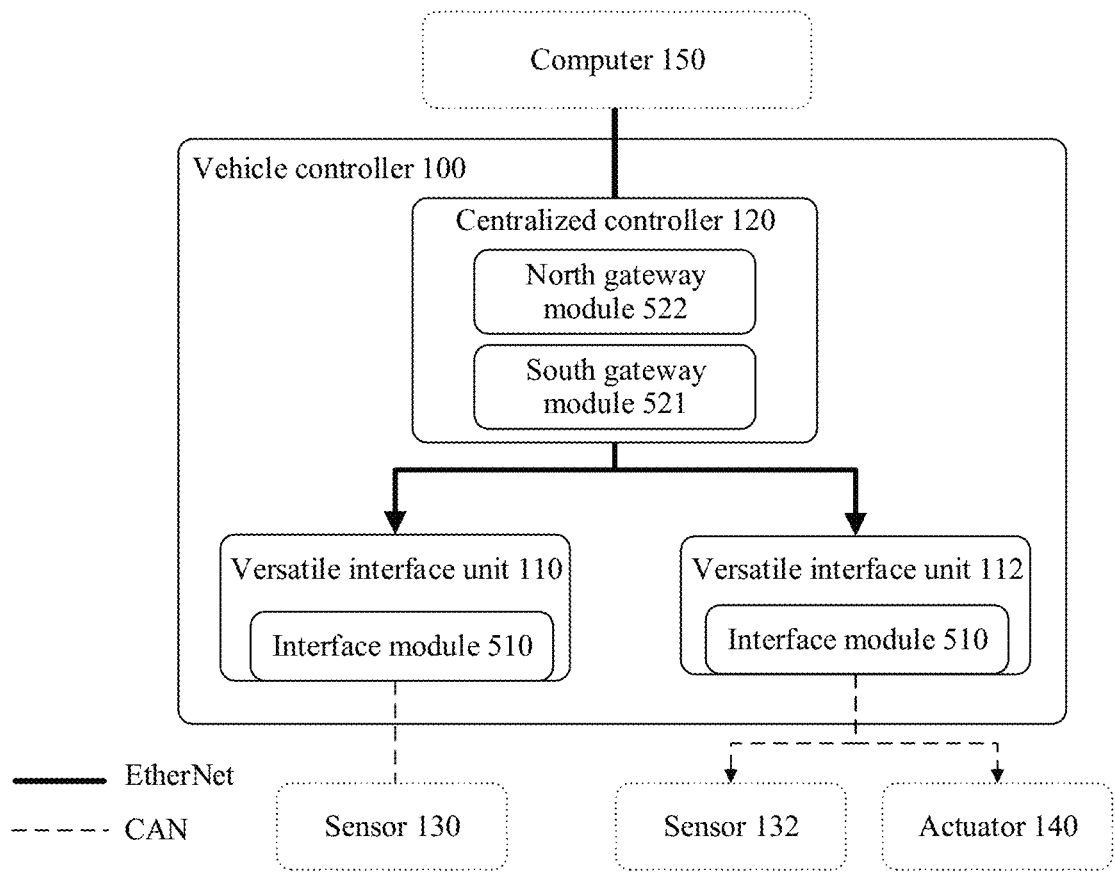
FIG. 6A is a schematic diagram of a structure of an embodiment of a vehicle controller according to this disclosure.

FIG. 6A shows a structure of an embodiment of a vehicle controller. The embodiment of the vehicle controller includes versatile interface units (for example, includes a versatile interface unit 110 and a versatile interface unit 112) and a centralized controller 120. Each versatile interface unit further includes an interface module 510. The centralized controller 120 includes a south gateway module 521 and a north gateway module 522.

The interface module 510 is configured to provide an SOA API to the vehicle controller 100 to open capabilities of vehicle sensors (including the sensor 130 and the sensor 132) and a vehicle actuator (including an actuator 140). The interface module 510 performs the foregoing step S410A and the optional embodiments of the step, obtains status data from the vehicle sensor, and further performs the foregoing step S440B and the optional embodiments of the step, to send a control command to the vehicle actuator.

Each versatile interface unit communicates with the centralized controller 120 based on an IP. Therefore, an interface provided by the interface module 510 is a middleware of Scalable service-Oriented MiddlewarE over IP (SOME/IP). When each versatile interface unit communicates with the centralized controller 120 in another communication manner, an interface provided by the interface module 510 is a service-oriented middleware in another communication manner.

The status data is binary sequence data in a physical format of the vehicle sensor, and the control command is binary sequence data in a physical format of the vehicle actuator.

The status data and the control command are based on a service-oriented template structure. The template includes a service type identifier, a data type identifier, and content. The data type identifier of the status data is a data identifier, and the data type identifier of the control command is a command identifier.

The south gateway module 521 performs the foregoing step S420A and optional embodiments of the step, and is configured to deserialize the status data received from the interface module 510, and convert the status data into an objectified second status message, so that the objectified second status message is used by an internal APP of the centralized controller 120 or sent by using the north gateway module 522. The south gateway module 521 further performs the foregoing step S430B and the optional embodiments of the step, and is configured to serialize the objectified second command message received from the north gateway module 522 or the APP that is in the centralized controller 120, and convert the objectified second command message into a binary control command, to send the binary control command to the interface module 510.

The south gateway module 521 communicates with the interface module 510 by using an internal protocol of the vehicle controller. For example, the south gateway module 521 communicates with the interface module 510 based on an IP.

The second status message and the second command message are in an internal message format of the vehicle controller, to facilitate use of a subscribed APP in the centralized controller.

A template structure of content of the second status message is the same as a template structure of content of the status data, and a template structure of content of the second command message is the same as a template structure of content of the control command.

Figure 6B:
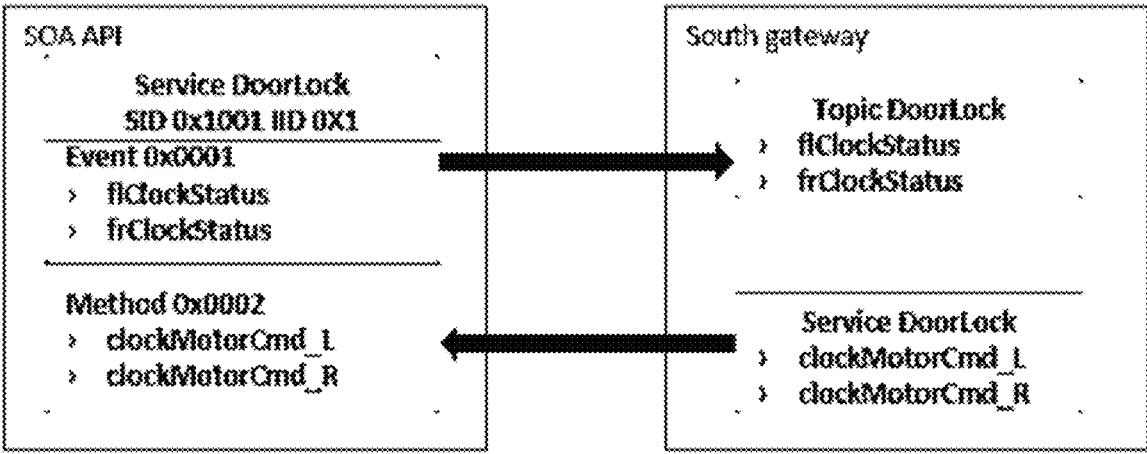
FIG. 6B is a schematic diagram of data conversion between an interface module and a south gateway module in an embodiment of a vehicle controller according to this disclosure.

For example, Service DoorLock is used as an example, FIG. 6B shows data conversion between the south gateway module 521 and the interface module 510. In FIG. 6B, the second status message that is in the internal message format of the centralized controller 120 and that is defined by the south gateway module 521 is Topic DoorLock. Content of the second status message is the same as content of the status data of the interface module 510, that is, content of Event of Service DoorLock, and includes a left door status (flClock-Status) and a right door status (frClockStatus). In this way, the south gateway module 521 deserializes, based on a same template structure, corresponding data of Event of Service DoorLock received from the interface module 510, and converts the corresponding data of Event of Service Door-Lock into objectified Topic DoorLock that is in the internal message format, to facilitate subscription of an internal APP of the centralized controller 120 or sending to the north gateway module 522. For another example, in FIG. 6B, the second command message that is of the centralized control-ler 120 and that is defined by the south gateway module 521 is Service DoorLock. Content of the second command message is the same as content of the control command of the interface module 510, that is, content of Method of Service DoorLock, and includes a left door control com-mand (clockMotorCmd_L) and a right door control com-mand (clockMotorCmd_R). In this way, the south gateway module 521 serializes, based on a same template structure, Service DoorLock received from the internal APP or received by the north gateway module 522, and generates a control command in a physical format of the vehicle actua-tor, to control a vehicle by using the interface module 510.

The north gateway module 522 performs the foregoing step S430A and step S440A and the optional embodiments of the two steps, and is configured to convert the second status message received from the south gateway module 521 into a first status message in an HTTP format, and send the first status message to an external computer 150. The north gateway module 522 further performs the foregoing step S410B and step S420B and the optional embodiments of the two steps, and is configured to receive a first command message in an HTTP format from the external computer 150 and convert the first command message into the second command message.

The first status message and the first command message are in an HTTP format widely used in the IT industry, and are in a REST style, to facilitate the external computer 150 using the first status message and the first command message by using an open IT ecosystem technology.

The first status message and the first command message are structured data represented by a JS object, to further facilitate use of the external computer 150.

A template structure of content of the first status message is the same as a template structure of content of the status data.

When the first status message is periodic data, the first status message uses chunked transfer encoding, to facilitate multiplexing of a link of the first status message.

Figure 6C:
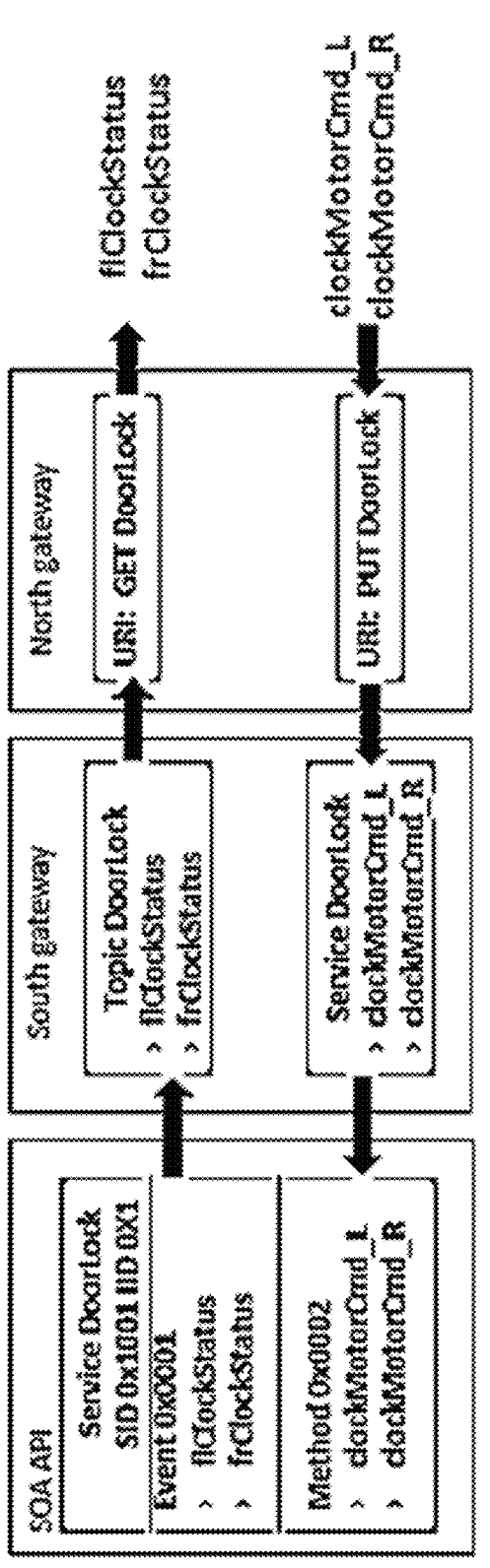
FIG. 6C is a schematic diagram of data conversion among an interface module, a south gateway module, and a north gateway module in an embodiment of a vehicle controller according to this disclosure.

For example, Service DoorLock is used as an example, FIG. 6C shows a data conversion relationship among the north gateway module 522, the south gateway module 521, and the interface module 510. A data conversion relationship between the south gateway module 521 and the interface module 510 has been described in FIG. 6B. The following describes data conversion between the north gateway mod-ule 522 and the south gateway module 521. In FIG. 6C, the first status message defined by the north gateway module 522 is URI: GET DoorLock. Content of the first status message is JSon structured data based on an HTTP format. GET represents obtaining, and obtained content of Door-Lock includes a left door status (flClockStatus) and a right door status (frClockStatus) that are in Topic DoorLock defined by the south gateway module 521. In this way, a logical chain of data mapping from the vehicle sensor to the interface module 510, to the south gateway module 521, to the north gateway module 522, and finally to the external computer 150 is completed. In addition, in FIG. 6C, the first command message received by using the north gateway module 522 is URI: PUT DoorLock. Content of the first command message is JSon structured data based on the HTTP format. PUT represents sending, and sent content of DoorLock includes a left door control command (clockMo-torCmd_L) and a right door control command (clockMotor-Cmd_R) that are in Service DoorLock defined by the south gateway module 521. In this way, a logical chain of data mapping from the external computer 150 to the north gateway module 522, to the south gateway module 521, to the interface module 510, and finally to the vehicle actuator is completed.

Figure 7:
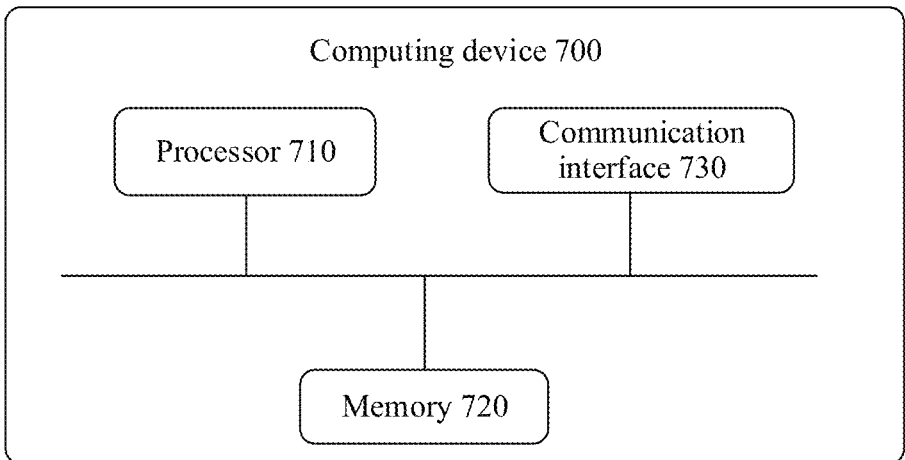
FIG. 7 is a schematic diagram of a structure of a computing device according to an embodiment of this disclosure.

FIG. 7 is a schematic diagram of a structure of a com-puting device 700 according to an embodiment of this disclosure. The computing device 700 includes a processor 710, a memory 720, and a communication interface 730.

It should be understood that the communication interface 730 in the computing device 700 shown in FIG. 7 may be used for communication with another device.

The processor 710 may be connected to the memory 720. The memory 720 may be configured to store program code and data. Therefore, the memory 720 may be an internal storage module of the processor 710, may be an external storage module independent of the processor 710, or may be a component that includes an internal storage module of the processor 710 and an external storage module independent of the processor 710.

It should be understood that, in this embodiment of this disclosure, the processor 710 may be a central processing unit (CPU). The processor may alternatively be another general-purpose processor, a digital signal processor (DSP), an application-specific integrated circuit (ASIC), a field-programmable gate array (FPGA) or another programmable logic component, a discrete gate or a transistor logic com-ponent, or a discrete hardware assembly. The general-pur-pose processor may be a microprocessor, or the processor may be any conventional processor, or the like. Alterna-tively, the processor 710 uses one or more integrated cir-cuits, and is configured to execute a related program, to implement a technical solution provided in this embodiment of this disclosure.

The memory 720 may include a read-only memory (ROM) and a random-access memory (RAM), and provides instructions and data to the processor 710. A part of the processor 710 may further include a non-volatile RAM. For example, the processor 710 may further store device type information.

When the computing device 700 runs, the processor 710 executes computer-executable instructions in the memory 720 to perform the steps of the foregoing method.

It should be understood that the computing device 700 according to this embodiment of this disclosure may correspond to a corresponding execution body of the method based on embodiments of this disclosure, and the foregoing and other operations and/or functions of modules in the computing device 700 are separately intended to implement corresponding procedures of the methods in embodiments of this disclosure. For brevity, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

A person skilled in the art may clearly understand that, for the purpose of convenient and brief description, for a detailed working process of the foregoing system, apparatus, and unit, refer to a corresponding process in the foregoing method embodiments, and details are not described herein again.

In several embodiments provided in this disclosure, it should be understood that the disclosed system, apparatus, and method may be implemented in other manners. For example, the described apparatus embodiments are merely examples. For example, the division of units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially or parts contributing to the conventional technology or some of the technical solutions may be embodied in a form of a software product. The computer software product is stored in a storage medium, and includes several instructions for instructing a computer device (which may be a personal computer, a server, a network device, or the like) to perform all or some of the steps of the methods described in embodiments of this disclosure. The storage medium includes any medium that can store program code, such as a Universal Serial Bus (USB) flash drive, a removable hard disk, a ROM, a RAM, a magnetic disk, or a compact disc.

An embodiment of this disclosure further provides a computer-readable storage medium. The computer-readable storage medium stores a computer program. When the program is executed by a processor, the program is used to perform at least one of the solutions described in embodiments of this disclosure.

The computer storage medium according to this embodiment of this disclosure may be any combination of one or more computer-readable media. The computer-readable medium may be a computer-readable signal medium or a computer-readable storage medium. The computer-readable storage medium may be but is not limited to an electric, magnetic, optical, electromagnetic, infrared, or semiconductor system, apparatus, or device, or any combination thereof. More specific examples (a non-exhaustive list) of the computer-readable storage medium include an electrical connection having one or more wires, a portable computer disk, a hard disk, a RAM, a ROM, an erasable programmable ROM (EPROM or flash memory), an optical fiber, a portable compact disk (CD) ROM (CD-ROM), an optical storage device, a magnetic storage device, or any suitable combination thereof. In this document, the computer-readable storage medium may be any tangible medium including or storing a program that may be used by an instruction execution system, apparatus, or device, or be used in combination with an instruction execution system, apparatus, or device.

The read-only signal medium may include a data signal propagated in a baseband or propagated as part of a carrier, where the data signal carries read-only program code. Such a propagated data signal may take a variety of forms, including but not limited to an electromagnetic signal, an optical signal, or any suitable combination thereof. The computer-readable signal medium may alternatively be any computer-readable medium other than the computer-readable storage medium. The computer-readable medium may send, propagate, or transmit the program used by the instruction execution system, apparatus, or device, or used in combination with the instruction execution system, apparatus, or device.

The program code included in the computer-readable medium may be transmitted by using any suitable medium, including but not limited to a wireless medium, a wire, an optical cable, RF, and the like, or any suitable combination thereof.

Computer program code for performing the operations in this disclosure may be written in one or more programming languages, or a combination thereof. The programming languages include an object-oriented programming language, such as JAVA, Smalltalk, and C++, and also include a conventional procedural programming language, such as a "C" language or a similar programming language. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

In this specification and claims, the terms "first, second, third, and the like" or similar terms such as a module A, a module B, and a module C are merely used to distinguish between similar objects, and do not represent a specific order of the objects. It may be understood that specific orders or sequences may be exchanged if permitted, so that embodiments of this disclosure described herein can be implemented in an order other than an order illustrated or described herein.

In the foregoing descriptions, involved reference numerals such as S110 and S120 that indicate steps do not necessarily indicate that the steps are to be performed based on the order, and consecutive steps may be transposed if allowed, or may be performed simultaneously.

The terms "include" and "comprise" used in this specification and claims should not be construed as being limited to the content listed below, and do not exclude other elements or steps. Therefore, it should be construed as specifying existence of a mentioned feature, whole, step, or part, but does not preclude existence or addition of one or more other features, wholes, steps, or parts and their groups. Therefore, the expression "a device including an apparatus A and an apparatus B" should not be limited to a device including only the components A and B.

"One embodiment" or "an embodiment" mentioned in this specification indicates that a particular feature, structure or property that is described with reference to the embodiment is included in at least one embodiment of this disclosure. Therefore, the terms "in one embodiment" or "in an embodiment" that appear in this specification do not necessarily indicate a same embodiment, but may indicate a same embodiment. Further, in one or more embodiments, the particular features, structures, or properties can be combined in any proper manner, as will be clear from this disclosure to a person of ordinary skill in the art.

It should be noted that the foregoing are merely example embodiments of this disclosure and used technical principles. A person skilled in the art may understand that this disclosure is not limited to specific embodiments described herein, and a person skilled in the art may make various obvious changes, readjustments, and replacements without departing from the protection scope of this disclosure. Therefore, although this disclosure is described in detail with reference to the foregoing embodiments, this disclosure is not limited to the foregoing embodiments. More other equivalent embodiments may be included without departing from the concept of this disclosure, and all fall within the protection scope of this disclosure.

What is claimed is:

1. A method, comprising:

receiving first data of a vehicle sensor, wherein the first data is in a first physical format of the vehicle sensor;

converting the first data into second data, wherein the second data is in an external message format;

outputting the second data;

receiving third data that is from outside a vehicle and that is in the external message format;

converting the third data into fourth data, wherein the fourth data is in a second physical format of a vehicle actuator; and sending the fourth data to the vehicle actuator;

wherein converting the first data into the second data comprises a south gateway converting the first data into an intermediate data in an internal message format and a north gateway converting the intermediate data into the second data, wherein converting the third data into the fourth data comprises the north gateway converting the third data into fifth data in the internal message format and the south gateway converting the fifth data into the fourth data, and wherein the method enables external access to the vehicle sensor and the vehicle actuator without reconstruction of an original vehicle harness and without introducing a professional test device.

2. The method of claim 1, wherein the first physical format is a binary sequence format.

3. The method of claim 1, wherein the external message format is a Hypertext Transfer Protocol (HTTP) format.

4. A vehicle comprising:

a sensor;

an interface coupled to the sensor;

a vehicle controller configured to receive, through the interface, first data of the sensor, wherein the first data is in a first physical format of the sensor; and a gateway system coupled to the interface and configured to:

convert the first data into second data, wherein the second data is in an external message format;

output the second data;

enable the vehicle controller to receive third data from outside the vehicle, wherein the third data is in the external message format; and enable the vehicle controller to convert the third data into fourth data, wherein the fourth data is in a second physical format of a vehicle actuator;

wherein the interface is further configured to enable the vehicle controller to send the fourth data to the vehicle actuator, wherein the gateway system comprises a south gateway and a north gateway that are separated from each other, wherein the south gateway is configured to convert between the first/second physical formats and an internal message format, wherein the north gateway is configured to convert between the internal message format and the external message format, and wherein the gateway system enables external access to the sensor and the actuator without reconstruction of an original vehicle harness and without introducing a professional test device.

5. The vehicle of claim 4, wherein the first physical format is a binary sequence format.

6. The vehicle of claim 4, wherein the external message format is a Hypertext Transfer Protocol (HTTP) format.

7. A computer program product comprising computer-executable instructions that are stored on a non-transitory computer-readable medium and that, when executed by at least one processor, cause an apparatus to:

receive first data of a vehicle sensor, wherein the first data is in a first physical format of the vehicle sensor;

convert the first data into second data, wherein the second data is in an external message format;

output the second data;

receive third data that is from outside a vehicle and that is in the external message format;

convert the third data into fourth data, wherein the fourth data is in a second physical format of a vehicle actuator; and send the fourth data to the vehicle actuator:

wherein the instructions further cause the apparatus to perform the conversions via a south gateway that handles physical-to-internal and internal-to-physical format conversions and a north gateway that handles internal-to-external and external-to-internal format conversions, and wherein the conversions enable external access to the vehicle sensor and the vehicle actuator without reconstruction of an original vehicle harness and without introducing a professional test device.

8. The computer program product of claim 7, wherein the first physical format is a binary sequence format.

9. The computer program product of claim 7, wherein the external message format is a Hypertext Transfer Protocol (HTTP) format.

10. The computer program product of claim 7, wherein the external message format is a File Transfer Protocol (FTP) format.

11. The method of claim 1, wherein the external message format is a File Transfer Protocol (FTP) format.

12. The vehicle of claim 7, wherein the external message format is a File Transfer Protocol (FTP) format.

13. The vehicle of claim 7, wherein the external message format is an Extensible Markup Language (XML) format.

14. The method of claim 1, wherein the external message format is an Extensible Markup Language (XML) format.

15. The computer program product of claim 13, wherein the external message format is an Extensible Markup Language (XML) format.

16. The computer program product of claim 7, wherein the second data and the third data are JavaScript object notation (JSon)-based structured data.

17. The computer program product of claim 7, wherein the first physical format is a hexadecimal sequence format.

18. The computer program product of claim 7, wherein the first physical format is an octal sequence format.

19. The method of claim 1, wherein the second data and the third data are JavaScript object notation (JSon-based) structured data.

20. The vehicle of claim 4, wherein the second data and the third data are JavaScript object notation (JSon-based) structured data.

* * * * *